May 5, 1964

G. F. HARRINGTON 3,131,739

AUTOMATIC SLICING CONTROLS

Filed Oct. 16, 1961

INVENTOR.
GEORGE F. HARRINGTON
BY
Kenyon & Kenyon
ATTORNEYS

3,131,739
AUTOMATIC SLICING CONTROLS

George Fox Harrington, Indianapolis, Ind., assignor to Hygrade Food Products Corporation, Detroit, Mich., a corporation of New York
Filed Oct. 16, 1961, Ser. No. 145,294
5 Claims. (Cl. 146—95)

This invention relates to automatic control mechanisms designed to facilitate the slicing of products such as meat to provide a given number of slices which weigh a certain predetermined amount.

The automatic control mechanisms of this invention also provide means for isolating the first few slices from each unit being sliced. The invention also relates to a synchronizing mechanism suitable for synchronizing rotation of two shafts.

In many industries, especially in the food processing industry, it is customary to package items in a manner which facilitates subsequent sale on a unit weight basis. Exemplary of this is the meat packing industry in which, for example, sliced bacon is generally packaged and sold in one pound units.

There has been considerable development in the design of slicing machines which are intended to provide the sliced item in a condition which simplifies the packaging operation. Typical of this type of machine is a bacon slicing machine in which a hydraulic ram feeds a slab of bacon into the path of a revolving knife blade, pausing intermittently so that the bacon slices are shingled in groups closely approximating the unit weight desired, for example one pound.

Generally, the bacon is sliced by the above-described machine to provide a given number of slices, the speed of the ram determining the thickness of the slice necessary to provide the unit weight desired. Since bacon slabs generally are not uniform in height, there tends to be a variation in the weight of a given number of slices of given thickness taken from one slab as compared to those taken from another. Heretofore this has generally been overcome by manually weighing each group of slices to determine whether there is too much or too little bacon in each group of shingled slices. Obviously, this is a time-consuming and expensive procedure.

Another problem peculiar to bacon slicing and possibly other similar operations is that the first few slices of bacon from any one slab tend to be non-uniform and unsightly in appearance. These first few slices generally are not packaged and sold as first-grade bacon.

Heretofore it has been the practice to put aside the first group of slices from a slab which include not only the first few slices but the balance of slices making up the given number of slices which the machine is adjusted to deliver.

It is an object of this invention to provide a first automatic control mechanism which senses the average height of the body being sliced, for example a slab of bacon, and proportionately adjusts the thickness of the slices to compensate for the deviation in height of the slab, thereby maintaining the unit weight of a given number of slices at a constant figure.

It is another object of this invention to provide a second automatic control mechanism which makes provision for removal of the first few irregular slices from a body, such as a slab of bacon, prior to delivering groups of slices having the same given number of slices per group.

Briefly stated, the first automatic control mechanism of this invention, hereinafter described as an automatic weight compensating mechanism, comprises a plurality of hold-down fingers positioned in essentially the same horizontal plane and adapted to gauge the height of the body being sliced, such as a slab of bacon, at spaced intervals across the width of the slab of bacon, a plurality of hydraulic cylinders respectively associated with each of the said hold-down fingers, each of the cylinders being equipped with pistons arranged so that vertical movement of each of the hold-down fingers is reflected in a proportionate movement of the piston of the hydraulic cylinder associated therewith, means connected to each of said hydraulic cylinders to sum the displacements of all of the said cylinders, a main hydraulic cylinder equipped with a piston and connected to said means whereby displacement of the said main cylinder is equal to the sum of the displacements of each of the said hydraulic cylinders, and a mechanical linkage means for converting the reciprocal movement of the piston of the said main cylinder to a corresponding rotary movement.

The slicing machine itself, which forms no part of present invention, is equipped with a ram for feeding the item to be sliced into the path of its rotating knife blade. This ram is customarily controlled by hydraulic means and the speed of the ram is adjusted by rotating a valve connected to the hydraulic system. The rotary movement provided by the aforesaid mechanical linkage means is directly connected to this hydraulic control valve, thereby adjusting the speed of the ram in accordance with the average thickness of the item being sliced. Since the rotation of the knife blade remains unchanged, increasing or decreasing the speed of the ram results in an increase or a decrease of the thickness of the slices cut by the rotating knife blade. By controlling the machine in accordance with another embodiment of this invention to provide a given number of slices per unit, the weight of each unit is controlled within very narrow tolerances.

The second automatic control mechanism, hereinafter referred to as the automatic feed control mechanism, comprises a probe associated with one of the hold-down fingers of the aforementioned mechanism and mounted in the path of the item to be sliced, such as a slab of bacon, as said item is being moved toward the rotating knife of the slicing machine. The probe is adapted for vertical movement and is so moved when displaced from its normal position by the leading edge of the item to be sliced. The vertical movement of the probe when so displaced is transmitted to a microswitch associated with the probe.

A counting control mechanism of conventional type is electrically connected into the circuit and provides for forward movement of the feed ram for a predetermined interval followed by an interval during which the ram is stationary, said intervals being termed "feed" interval and "stop" interval, respectively. By use of such a mechanism, the slices of bacon are provided in individual groups having equal numbers of slices.

Actuation of the microswitch associated with the probe interrupts the forward movement of the ram. Electrical means, including relay circuits, are provided to place further forward movement of the feed ram under the control of the aforementioned counting mechanism whereby the feed ram commences forward movement at the beginning of the next succeeding feed interval.

The probe is located a predetermined distance ahead of the rotating knife blade. This distance is determined on the basis of the number of slices which must be initially taken from the bacon slab or other item to be sliced because of their unsuitability for sale as first quality product. In other words, assuming that the feed interval of the counting mechanism is set in conjunction with the speed of the ram to provide eighteen slices per unit and further assuming that the first six slices of each bacon slab are unsuitable for sale as first quality product, then the probe is located a distance ahead of the rotating knife blade which corresponds to the time required to cut twelve slices. Thus after the probe is displaced and electrical means have placed the forward movement of the ram under control of the counting mechanism, forward movement of the ram during the next succeeding feed interval produces no slices until the leading edge of the slab of bacon has traveled from the probe to the rotating knife blade. The time for such travel is actually a part of the feed interval of the counting mechanism. At this point, slices are produced as the ram continues to move forward for the balance of the feed interval.

Thus, by proper choice of location of the probe, the first few slices obtained can be discarded in their entirety, thereby eliminating the need for inspection of the first group of slices to remove some and leaving others. During the next succeeding feed intervals slices are produced during the entire feed interval of the counting mechanism, since the leading edge of the bacon is always in the immediate vicinity of the rotating knife blade.

The present invention will be more readily understood when described in conjunction with the drawings, in which:

FIGURE 6 is a side elevational view of that portion of the structure shown in FIGURE 4 showing the effect of vertical movement of the probe.

Figure 1:
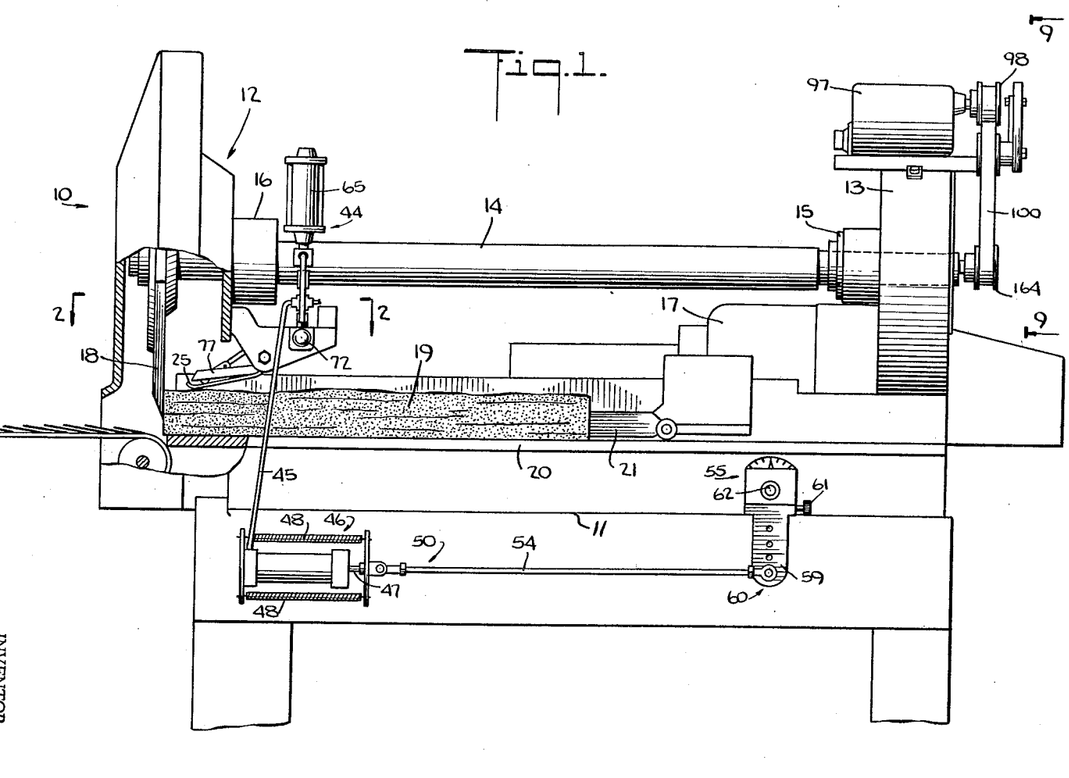
FIGURE 1 is a front elevational view partially in cross-section of a typical automatic slicing machine adapted with the automatic control mechanisms of this invention.

With respect now to the drawings, and more particularly FIGURE 1, there is depicted slicing machine 10, typically being constructed with a base 11 on which are mounted the various component parts of an automatic slicing machine. End support members 12 and 13 are connected to base 11 and support rotatable shaft 14 in bearings 15 and 16. Shaft 14 is powered by motor 17. Connected to the opposite end of shaft 14 is knife blade 18 which has a radial cutting edge, not shown.

In the drawings machine 10 is depicted as adapted for use in slicing slabs of bacon, but it is to be understood that any machine of this general type may be used in conjunction with the control mechanisms of this invention. As seen in FIGURE 1, a slab of bacon 19 rests on bed 20, which latter rests on base 11. Slab 19 is advanced into knife blade 18 by the operation of ram 21. Ram 21 is reciprocally moved by an hydraulic system, not shown. The details of the movement of ram 21 do not fall within the scope of this specification and are well known to those skilled in the art. It is sufficient to note at this point that the hydraulic system for moving ram 21 is conventional and is controlled by a flow control valve responsive to rotary adjustment. Additionally, the overall-start-stop movement of ram 21 is controlled by a conventional electrical mechanism, also not shown.

Figure 2:
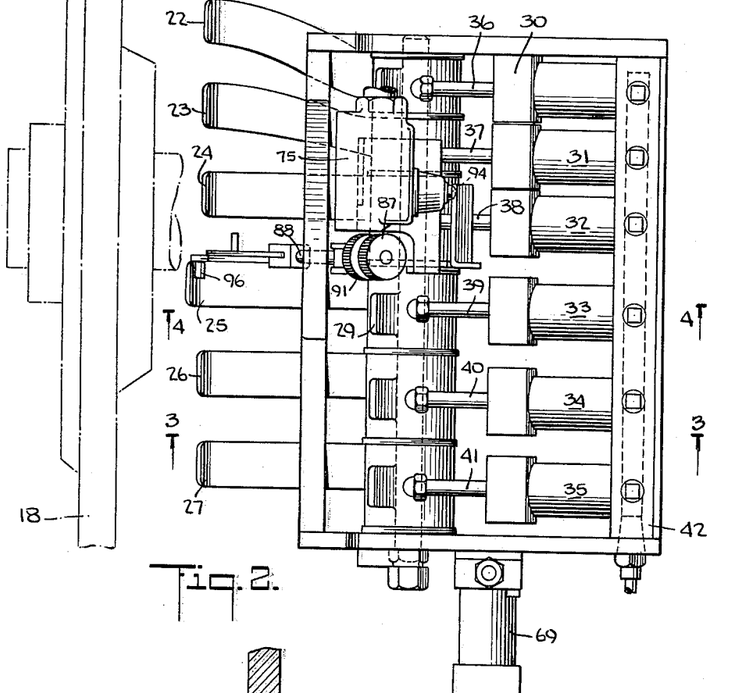
FIGURE 2 is an enlarged plan view taken along line 2—2 of FIG. 1 of the hold-down fingers and associated components of one embodiment of this invention.
Figure 3:
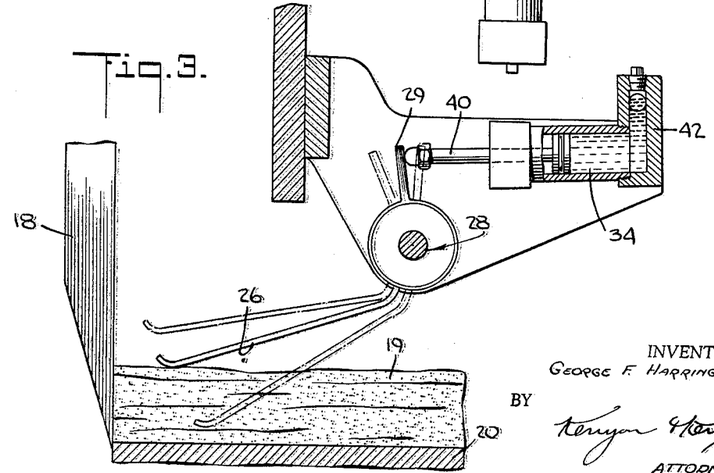
FIGURE 3 is a side elevational view, partly in section, of one of the hold-down fingers, taken along line 3—3 of FIGURE 2.
Figure 5:
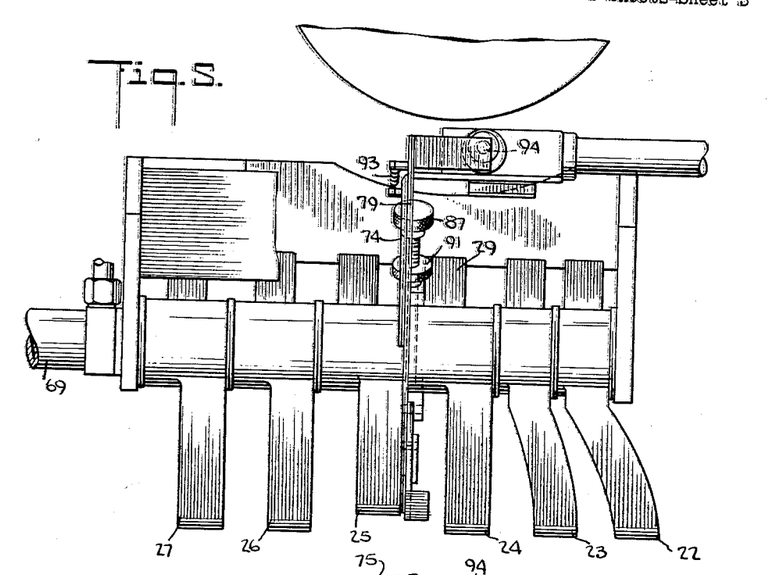
FIGURE 5 is a front elevational view of the fingers and associated components of FIGURE 2.

The sensing portion of the automatic weight compensating mechanism of this invention is shown in detail in FIGURES 2, 3 and 5. This portion of the mechanism includes hold-down fingers 22, 23, 24, 25, 26 and 27. Although six hold-down fingers are used in the embodiment depicted in the drawings, it is to be understood that the number of such fingers is clearly a matter of choice. As shown best in FIGURE 3, the hold-down fingers are pivotable about shaft 28. As depicted in FIGURE 3, hold-down finger 26 has a hub mounted lug 29 which rotates about shaft 28 as the result of corresponding movement of finger 26. Each of the hold-down fingers is so equipped.

As shown in detail in FIGURES 2 and 3, hydraulic cylinders 30, 31, 32, 33, 34 and 35 are associated with hold-down fingers 22 through 27, respectively. Cylinders 30 through 35 are provided with piston rods 36 through 41, respectively.

As shown in FIGURE 3, upward movement of finger 26 results in rotation of lug 29, which in turn contacts piston 40 and causes it to displace a certain amount of hydraulic fluid from within the cylinder 34.

Each of cylinders 30 through 35 is connected to manifold 42. Accordingly, the sum of all of the displacements of cylinders 30 through 35 is represented by the total amount of hydraulic fluid forced into manifold 42. It is advantageous to use a plurality of fingers so that any variations in height across the slab of bacon may be taken into account in determining the appropriate slice thickness necessary to provide the predetermined unit weight to a given number of slices.

Figures 7, 8:
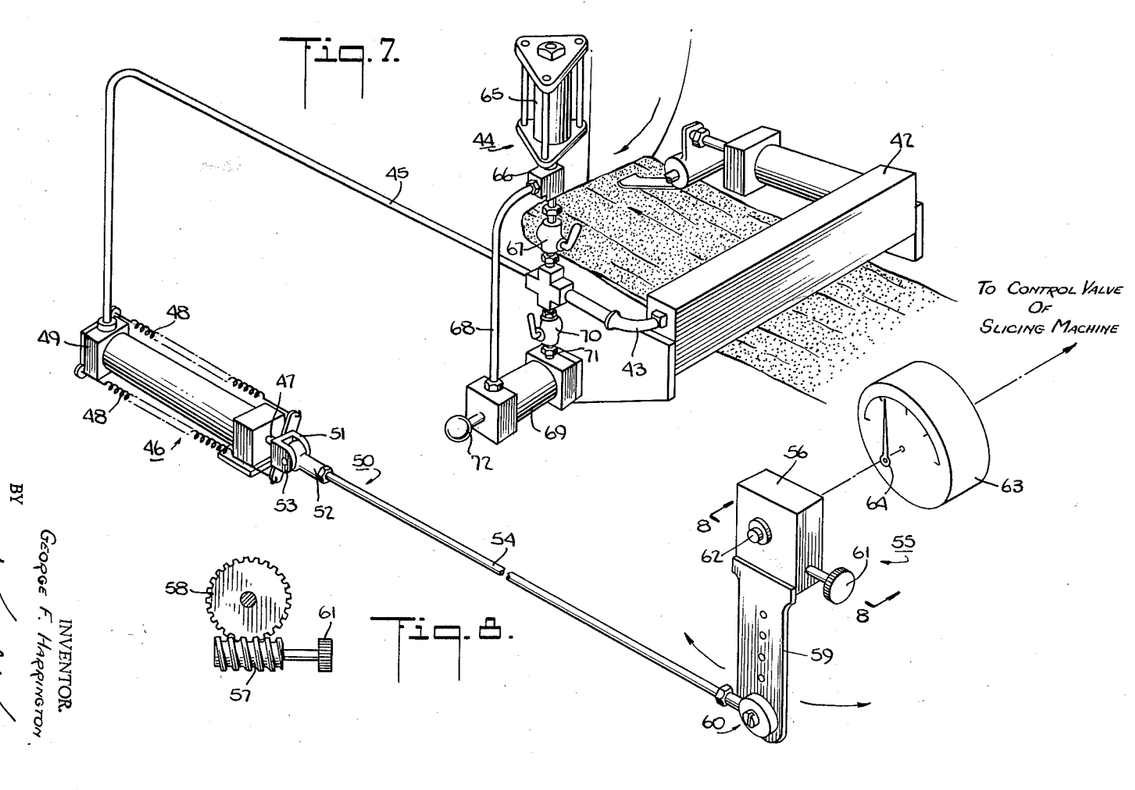
FIGURE 7 is a perspective view of the various components of the automatic weight compensating mechanism of this embodiment of the invention.
FIGURE 8 is a schematic view of the relationship of the elements in the mechanical coupling, taken along line 8—8 in FIGURE 7.
Figure 8:
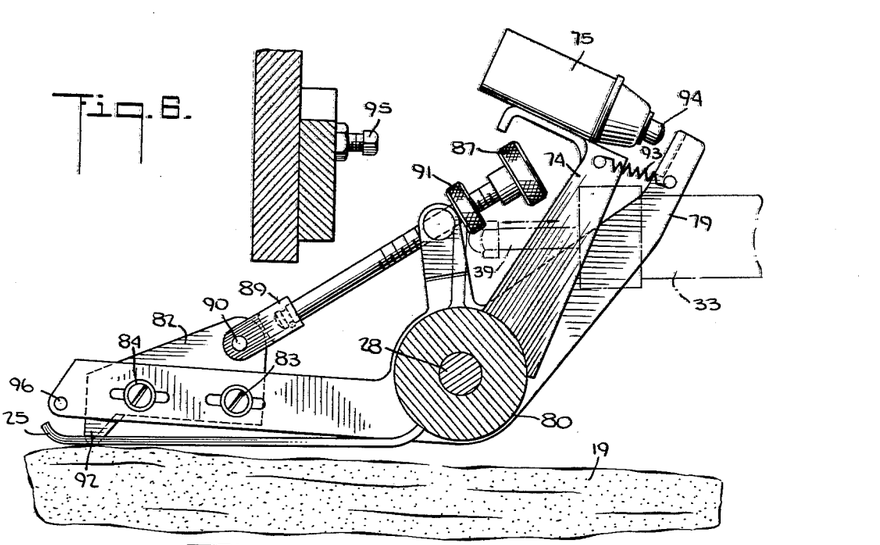

FIGURE 7 shows manifold 42, and its connection with the balance of the automatic weight compensating mechanism is best described in conjunction with this figure. Assuming for purposes of discussion that there is an overall positive displacement of hydraulic fluid into manifold 42, this displacement is fed through line 43. Line 43 is connected to hydraulic fluid reservoir system 44, which will be described in detail below. Line 45, which during operation of the automatic mechanism is essentially directly connected to line 43, transports the displaced fluid into main hydraulic cylinder 46.

Main hydraulic cylinder 46 is provided with a piston rod 47 which moves reciprocally in accordance with the fluid supply to the cylinder. Tension springs 48 are connected between piston rod 47 and one end 49 of main cylinder 46 to cause piston rod 47 to move into the hydraulic cylinder 46 in response to a negative displacement of fluid from manifold 42. In other words, if the average movement of fingers 22 through 27 is in a downward direction, manifold 42 will have a deficiency of fluid due to the fluid re-entering the various cylinders 30 through 35. In order to make this phase of the control action more positive, springs 48 are provided. It is clear that the reverse movement of piston rod 47, caused by a positive displacement of fluid 42, is inherently positive in its effect and thus the use of springs 48 does not affect this movement.

Piston rod 47 is connected to linkage 50 which consists of yoke 51 to which is connected eye 52 by pin 53. Eye 52 is free to rotate with respect to yoke 51 by virtue of the pin connection.

Rod 54 connects eye 52 of linkage 50 with a mechanically operating mechanism suitable for transforming the reciprocal movement of piston rod 47 into a control signal to the hydraulic system of the slicing machine so that the speed of ram 21 may be adjusted according to the thickness of the bacon or other item being sliced.

As stated above, the speed control of the hydraulic system is customarily achieved by use of a valve which when rotated in one direction increases the speed, and when rotated in the opposite direction decreases the speed. Accordingly, it is necessary to convert the reciprocal movement of piston rod 47 to a rotary movement. To this end, a mechanical linkage, such as a worm gear reducer, is employed.

Shown in FIGURE 7 is reducer 55. Reducer 55 consists essentially of a body 56, a worm gear 57 and a spur gear 58, the latter two items being shown in FIGURE 8. Extension 59 is connected to body 56, as shown in FIGURE 7. Rod 54 is pivotally connected to the lower portion of extension 59 through linkage 60.

As is well known, a worm gear reducer is self-locking. Stating this in a way more appropriate to the present invention, with reference to FIGURE 8, rotation of worm gear 57 produces a proportionate rotation of spur gear 58, whereas it is impossible to cause worm gear 57 to rotate by driving spur gear 58. Thus once the relationship between spur gear 58 and worm gear 57 is established by manual movement of knob 61 attached to worm gear 57, this relationship cannot be changed except by further rotation of knob 61.

As is customary, spur gear 58 is rotatably mounted within body 56, the bearing therefor being shown in FIGURE 7 and identified with reference numeral 62. Likewise, worm gear 57 is also rotatably mounted within reducer body 56.

As shown schematically in FIGURE 7, spur gear 58 is directly connected to the control valve of the slicing machine, the latter not being specifically shown in the drawings. Thus any rotation of spur gear 58 causes an equal rotation of the control valve.

Assume that rod 54 moves from left to right as a result of a positive displacement of hydraulic fluid from manifold 42. By virtue of the linkages discussed above, extension 59 is caused to rotate in a counterclockwise direction, and this rotation is in turn transmitted to reducer body 56. Thus, reducer body 56 is caused to rotate by the horizontal movement of rod 54. As stated above, there can be no relative movement between spur gear 58 and worm gear 57 unless knob 61 is rotated. Accordingly, rotation of body 56 produces an equal rotation of the assembly contained therein, to wit, spur gear 58 and worm gear 57. In other words, spur gear 58 is forced to rotate an amount equal exactly to the rotation of body 56. As stated above, this rotation is then transmitted to the control valve of the slicing machine and the speed of ram 21 is adjusted accordingly.

The use of a worm gear reducer 55 is primarily for the purposes of fine adjustment. Its operation is exemplified by the following description. In the cutting of a certain item, such as a bacon slab, the maximum and minimum heights of the bacon slabs are fairly well known in advance. From these figures the average height can readily be determined. Since it is always preferable to operate a control system so that equal latitude is available at both extremes, knob 61 is rotated, thereby causing gear 58 to rotate, and this in turn changes the setting of the control valve of the slicing machine without affecting the position of reducer 56 and associated components such as connecting rod 54, piston rod 47 and the like. As shown schematically in FIGURE 7, a dial face 63 and dial indicator 64 are provided. Dial indicator 64 is connected to spur gear 58 to reflect its movements and dial face 63 is stationary. Thus, knob 61 is rotated and this rotation changes the position of dial indicator 64 to the desired calibration point for the particular item to be sliced.

The operation of the hydraulic fluid reservoir system 44 is as follows. Transparent reservoir 65 serves as a supply of fluid as well as a purge chamber. As shown in FIGURE 7, reservoir 65 is connected to a T connection 66 which in turn is connected to valve 67 and one end 68 of a manually operable hydraulic cylinder 69. Valve 67 is connected to valve 70 which in turn is connected to the other end 71 of hydraulic cylinder 69.

Air entrained in the system can be worked up into the reservoir in the following manner. Valves 67 and 70 are opened and piston rods 36 through 41 are manually reciprocated alternately with piston rod 72 of hydraulic cylinder 69.

The method of charging hydraulic fluid into the system is as follows. Valves 67 and 70 are both opened. Piston rod 72 of cylinder 69 is withdrawn fully and then retracted to assure expulsion of any entrapped air. Piston rod 72 is again withdrawn and valve 67 is closed. Moving piston rod 72 back into cylinder 69 thus pumps fluid into the system. Sufficient fluid is introduced into the system until piston rod 47 of cylinder 46 is caused to commence movement. It is desirable to add slightly more fluid to assure rapid, positive hydraulic action. Valve 70 is then closed, thus sealing the hydraulic system.

Figure 4:
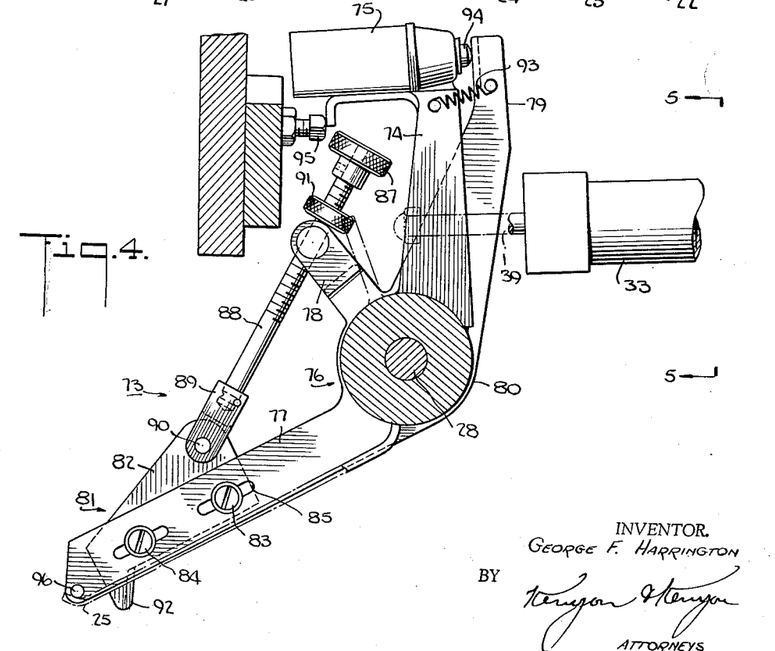
FIGURE 4 is a side elevational view on an enlarged scale of the probe associated with one of the fingers, taken along line 4—4 of FIGURE 2.

The automatic feed control mechanism of this invention relies on the use of a probe to indicate the position of the item being sliced with respect to the rotating knife blade. Shown in FIGURE 4 is one embodiment of a probe mechanism suitable for use with this invention. As indicated in FIGURE 2, probe mechanism 73 is associated with hold-down finger 25. This is merely a matter of convenience and the probe mechanism 73 may in fact be associated with any of the hold-down fingers of the above-described control mechanism. As shown in FIGURE 4, hold-down finger 25 revolves about shaft 28. Attached to hold-down finger 25 is web 74, and attached to web 74 is limit switch 75. Thus rotation of hold-down finger 25 about shaft 28 produces a corresponding rotation of limit switch 75.

Probe mechanism 73 is made up of a 3-fingered member 76 which has fingers 77, 78 and 79 attached to hub 80 which is rotatable about shaft 28. As shown in FIGURE 4, lobe assembly 81 consists of a dog 82 which is reciprocally adjustable with respect to finger 77 by means described below. The motion of dog 82 is guided by screws 83 and 84 which slide within slots 85 and 86, respectively. The particular location of dog 82 with respect to finger 77 is determined by rotation of positioning knob 87.

Positioning knob 87 is connected to threaded shaft 88 which in turn is connected to yoke 89. Yoke 89 is pivotally connected to dog 82 by pin 90. Shaft 88 is threadably engaged with finger 78. Accordingly, rotation of positioning knob 87 causes shaft 88 to move with respect to finger 78. This movement is transmitted to dog 82 and it in turn moves along finger 77. Lock nut 91 is provided to lock the position of shaft 88 with respect to finger 78, and thus lock the position of dog 82 with respect to finger 77.

The extension at the lower end of dog 82 is called the lobe of probe mechanism 73 and is indicated by reference numeral 92.

As indicated in FIGURE 4, a tension spring 93 is connected between finger 79 and web 74. This causes constant pressure to be exerted against actuating segment 94 of limit switch 75. Also shown in FIGURE 4 is an adjustable stop 95 which prevents finger 25 from further counterclockwise rotation.

Connected to finger 77 of probe mechanism 73 is pin 96. This pin is normally seated in the curved terminal portion of hold-down finger 25. Since 3-fingered member 76 is free to rotate about shaft 28 independently of hold-down finger 25, the only obstacle to prevent counterclockwise rotation under the influence of gravity is limit switch 75 which is in the path of finger 79. To relieve the sensitive limit switch 75 from the burden of supporting probe mechanism 73, pin 96 is provided.

With respect to FIGURE 4, assume that a slab of bacon or other item to be sliced is being moved from right to left toward the rotating knife blade. The slab will first make contact with some portion of finger 25 which is intermediate its ends. As the slab of bacon continues its movement, finger 25 will be lifted and rotated in a clockwise direction about shaft 28. Probe mechanism 73 will be carried along by finger 25 due to the interlocking of pin 96 with the curved end portion of hold-down finger 25. Finally, the leading edge of the slab of bacon will make contact with lobe 92. Thus lobe 92 will be subjected to a lifting force which is independent of that resulting from the upward movement of hold-down finger 25. The result is that 3-fingered member 76 rotates about shaft 28 with respect to hold-down finger 25 and against the biasing force of tension spring 93. When a given relative movement between 3-fingered member 76 and hold-down finger 25 has occurred, limit switch 75 will be actuated by the removal of finger 79 from contact with actuating segment 94. As is described below, this actuation of limit switch 75 is electrically utilized to control the movement of the slab of bacon from this point on.

FIGURE 6 depicts probe mechanism 73 and hold-down finger 25 at a time subsequent to actuation of limit switch 75.

It is clear that probe mechanism 73 is responsive only to the horizontal position of the leading edge of the item to be sliced. Actuation of the limit switch 75 occurs when the leading edge reaches this given horizontal position and is independent of the height of the item to be sliced. It is the relative movement between probe mechanism 73 and hold-down finger 25 which actuates limits switch 75, and, as has been described, this can occur only when lobe 92 is lifted by contact with the leading edge of the item to be sliced. The precise point at which this occurs is set by appropriate adjustment of positioning knob 87.

For use in conjunction with this embodiment of the invention, an automatic counting mechanism is necessary. Any conventional counting mechanism which provides a control signal suitable for use in an electrical circuit may be used. A counting mechanism which has been found eminently well suited for use in this embodiment is a "Cyclo-Monitor" manufactured by the Counter and Control Corporation, Milwaukee, Wisconsin.

This particular type of counting mechanism involves the use of a rotating gear which moves axially along a threaded shaft, and provides a control signal by actuating a switch at end of each cycle or interval. It is sufficient for these purposes to note that the Cyclo-Monitor indicates the end of one interval and the beginning of another by the opening or closing of switch contacts. It is possible to set the Cyclo-Monitor to provide a time interval corresponding approximately to the feed interval and stop interval, as described above. Although the embodiment depicted in the drawings is shown with a Cyclo-Monitor unit, it is to be understood that other counting mechanisms may be used provided they deliver an electrically-usable signal.

Figure 9:
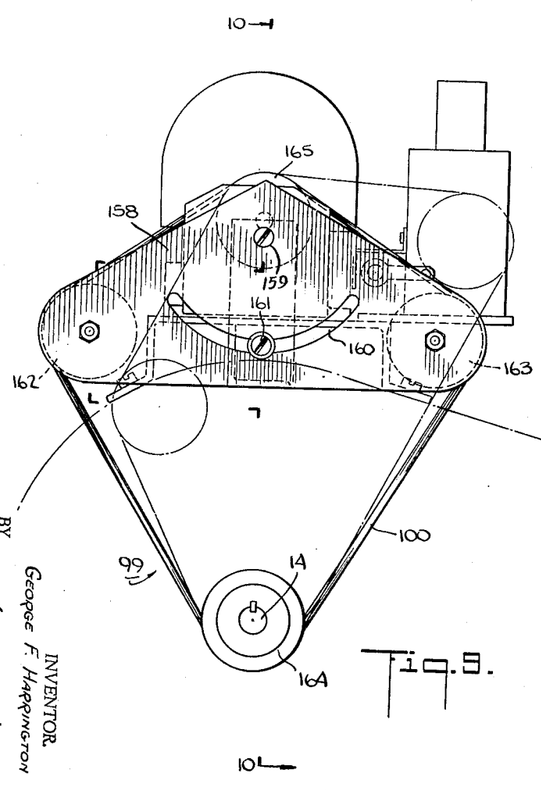
FIGURE 9 is a front elevational view, taken along line 9—9 of FIGURE 1 of a synchronizing mechanism employed in this invention.
Figure 10:
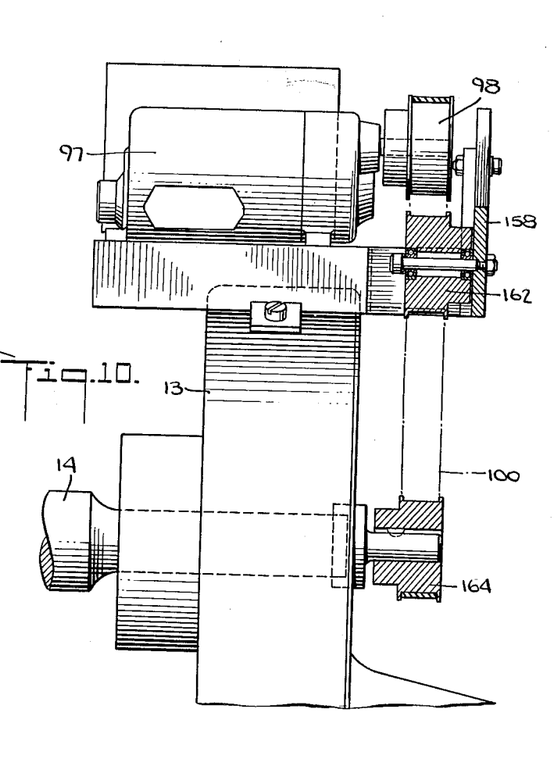
FIGURE 10 is a side elevational view, taken along line 10—10 partly in section, of the mechanism shown in FIGURE 9.

As shown in FIGURES 9 and 10, a counting mechanism 97 is mounted on end support 13. The shaft 98 which drives the counting mechanism 97 is synchronized with shaft 14 to which knife blade 18 is attached by means of synchronizing mechanism 99, which will be described in detail below. It is noted at this point that synchronizing mechanism 99 provides for direct connection between shafts 14 and 98 by means of a timing belt 100 or other positive drive.

Figure 11:
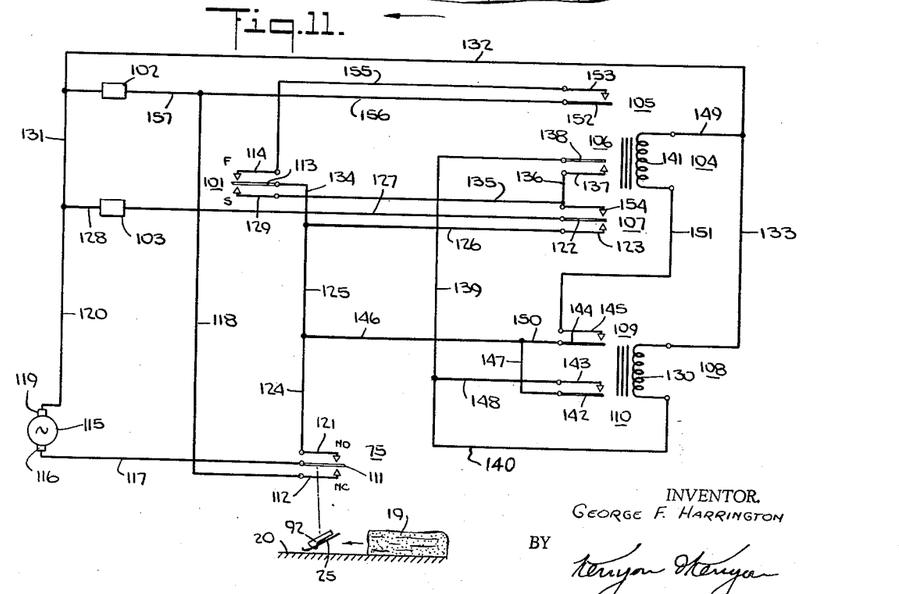
FIGURE 11 is a schematic diagram of an electrical circuit employed in one embodiment of this invention.

FIGURE 11 is a schematic drawing of an electrical circuit which coordinates the operation of the probe mechanism 73 with the counting action of counting mechanism 97. Shown in FIGURE 11 is switch 101 which is part of the counting mechanism 97; "feed" solenoid valve coil 102 which actuates the movement of feed ram 21; "stop" solenoid valve coil 103 which stops the movement of feed ram 21; limit switch 75; relay 104 and associated switches 105, 106, 107; and relay 108 and associated switches 109 and 110.

To simplify explanation of the circuit of FIGURE 11, assume that the feed ram 21 has been actuated by manual operation to "feed" solenoid valve coil 102 and the slab of bacon or item to be cut is approaching the hold-down fingers. Limit switch 75 is normally closed and armature 111 is in contact with switch contact 112.

When lobe 92 of probe mechanism 73 is moved with respect to hold-down finger 25 so as to move finger 79 away from limit switch 75, this switch is opened and thus armature 111 is moved out of contact with switch contact 112. Prior to this actuation of limit switch 75, electrical power from source 115 was supplied to both sides of "feed" solenoid valve coil 102 in the following manner: from terminal 116 through lead 117 to armature 111, to switch contact 112 and through lead 118; and from terminal 119 through lead 120. Thus it was possible to energize the "feed" solenoid valve coil 102 since there was a completed electrical circuit through this switch and power source 115.

When probe mechanism 73 is actuated by the leading edge of the item to be sliced, armature 111 is moved out of contact with switch contact 112 and into contact with switch contact 121. This removes electrical power from across the "feed" solenoid valve coil 102. Armature 122 of switch 107 is normally in contact with switch contact 123. Thus power source 115 is connected across "stop" solenoid valve coil 103 through the following circuit: from terminal 116, through lead 117 to armature 111, to switch contact 121, through lead 124, through lead 125, through lead 126 to switch contact 123, to armature 122, and through lead 127 to one side of "stop" solenoid valve coil 103; from terminal 119, through lead 120, and through lead 128 to the other side of "stop" solenoid valve coil 103. Thus power is removed from "feed" solenoid valve coil 102 and placed across "stop" solenoid valve coil 103, thereby stopping the movement of ram 21.

Although ram 21 has ceased movement, knife blade 18 and shaft 14 continue to rotate. The rotation of shaft 14 is transmitted to shaft 98 of counting mechanism 97 and upon completion of the next succeeding stop interval of counting mechanism 97, switch 101 assumes control of the operation. The programming of the stop and feed intervals of counting mechanism 97 is reflected in a movement of switch 101, the feed interval of counting mechanism 97 being represented by contact of armature 113 with switch contact 114, and the stop interval being represented by contact of armature 113 with switch contact 129.

The electrical connection between armature 113 and switch contact 129 caused by counting mechanism moving into a stop interval completes a circuit which energizes coil 130 of relay 108. This is brought about in the following manner. Terminal 119 of power source 115 is directly connected to one side of coil 130 through leads 120, 131, 132 and 133. Terminal 116 is connected to the other side of coil 130 through lead 117, armature 111, switch contact 121, lead 124, lead 125, lead 134, armature 113, switch contact 129, lead 135, lead 136, switch contact 137, armature 138, lead 139 and lead 140. Armature 138 is normally in contact with switch contact 137 when coil 141 is not energized.

Energization of coil 130 causes armature 142 to contact switch contact 143, and armature 144 to contact switch contact 145. Thus, normally open switches 109 and 110 are closed by energization of coil 130. The closing of switch 110 thus connects coil 130 to terminal 116 through the following circuit: terminal 116, lead 117, armature 111, switch contact 121, lead 124, lead 146, lead 147, armature 142, switch contact 143, lead 148 and lead 140. This by-passes the counting mechanism switch 101.

When switch 109 is closed, coil 141 is energized. Thus, one side of coil 141 is connected to terminal 119, through lead 120, lead 131, lead 132, and lead 149. The other side of coil 141 is connected to terminal 116 through lead 117, armature 111, switch contact 121, lead 124, lead 146, lead 150, armature 144, switch contact 145, and lead 151.

Switch 105 of relay 104 is normally open, switch 106 is normally closed, and switch 107 normally has armature 122 in contact with switch contact 123. Energization of coil 141 reverses the contacts on these switches. Thus armature 152 makes contact with switch contact 153, armature 138 moves out of contact with switch contact 137, and armature 122 moves out of contact with switch contact 123 and into contact with switch contact 154.

It will be recalled that power was placed across "stop" solenoid valve coil 103 through the circuit made by contact of armature 122 with switch contact 123. Since switch 107 is no longer in this position, power is not supplied to "stop" solenoid valve coil 103 through this circuit. However, since the event which caused the aforementioned actuation of relays 104 and 108 was the movement of counting mechanism switch 101, wherein contact was made between armature 113 and switch contact 129, power is connected across "stop" solenoid valve coil 103 through the following circuit: from terminal 116, lead 117, armature 111, switch contact 121, lead 124, lead 125, lead 134, armature 113, switch contact 129, lead 135, switch contact 154, armature 122, and lead 127.

The closing of switch 105 thus completes a circuit between switch 101 of counting mechanism 97 and "feed" solenoid valve coil 102 in the following manner: from switch contact 114 through lead 155, switch contact 153, armature 152, lead 156, and lead 157.

Thus the actuation of limit switch 75 by the leading edge of the item to be sliced stopped feed ram 21 for a period of time equal to the duration of the balance of the feed interval of counting mechanism 97. When counting mechanism 97 entered the stop interval, switch 101 was actuated, which in turn energized relays 104 and 108. Immediately upon such energization, circuits are made and broken in the manner described so as to put the "feed" solenoid valve coil 102 and "stop" solenoid valve coil 103 directly under control of switch 101 of counting mechanism 97.

As soon as counting mechanism 97 arrives at the end of the stop interval and commences to enter the feed interval, armature 113 moves out of contact with switch contact 129 and into contact with switch contact 114. This acts to transfer power from the "stop" solenoid valve coil 103 to "feed" solenoid valve coil 102 and thus ram 21 moves forward. Alternate feed and stop cycles then follow one another until ram 21 completes its forward travel. At this point ram 21 is reversed, another item to be sliced is put into the slicing machine and the above procedure repeated.

As described above, counting mechanism 97 controls the start and stop movement of ram 21. In order for the first slice of the group of slices produced during any given feed interval to have a thickness equal to that of the other slices in the group, it is necessary that commencement of forward movement of ram 21 be exactly synchronized with the cutting edge of knife blade 18. The thickness of any slice is determined by the amount of forward movement of ram 21 which occurs during one revolution of the cutting edge of knife blade 18. After the first slice, the balance of the slices of any group will each have a thickness proportional to the rate of movement of ram 21 with respect to the rate of rotation of knife blade 18. This is not true with respect to the first slice of a group. The synchronizing mechanism 99 shown in FIGURES 9 and 10 of this invention is provided to assure uniformity of all of the slices of a given group, including the first slice.

Assuming that no synchronizing mechanism was used, after the last slice of the preceding group, ram 21 would move forward a distance equal to some fraction of a full slice thickness. At this point ram 21 would stop under control of counting mechanism 97. However, as stated above, knife blade 18 continues to rotate. After the stop interval of counting mechanism 97, ram 21 would again proceed to move forward. It is possible, therefore, for the ram to move forward an additional distance equal to a full slice thickness before the cutting edge of knife blade 18 rotates to its cutting position and makes a slice. Accordingly, this first slice would have a thickness in excess of that of the other slices of the group. It is also possible to have a first slice which is thinner than the other slices of the group. Synchronizing mechanism 99 prevents this non-uniformity in the following manner.

To assure that the first slice of a group will not have a non-uniform thickness, it is necessary to synchronize the forward movement of ram 21 with the cutting edge of knife blade 18. That is to say, the start and stop of ram 21 is synchronized with the circumferential position of the cutting edge of knife blade 18 so that the distance ram 21 moves between the time interval after the last slice is cut in the preceding group and before the first slice is cut in the next succeeding group is equivalent to the desired slice thickness. To this end, counting mechanism 97 is synchronized with the cutting edge of knife blade 18 by means of synchronizing mechanism 99.

Synchronizing mechanism 99 provides a simple, convenient way of rotating shaft 98 of counting mechanism 97 with respect to shaft 14. In other words, synchronizing mechanism 99 makes possible the adjustment of movement of ram 21 with specific reference to the position of the cutting edge of knife blade 18. With reference, now, to FIGURES 9 and 10, synchronizing mechanism 99 comprises bracket 158 which is pivotable about pivot point 159. Slot 160 and lock nut 161 are provided to lock bracket 158 in place after making the necessary adjustment.

Bracket 158 is provided with free-running pulleys 162 and 163. Pulley 164 is keyed to shaft 14 and pulley 165 is connected to shaft 98. A timing belt 100 is provided so that rotation of shaft 14 causes movement of timing belt 100, and this in turn causes rotation of pulleys 162, 163 and 165.

As shown in the drawings, bracket 158 is approximately in the center of its adjustment span. This means that if an imaginary line were to be drawn between the centers of pulleys 164 and 165 there would be an equal length of timing belt 100 on either side of such an imaginary line. Assume now that the lock nut 161 is loosened and that bracket 158 is moved to the position shown in phantom in FIGURE 9. This movement changes the relative amounts of timing belt 100 on both sides of the aforementioned imaginary line. Since drive shaft 14 has a substantial amount of inertia, it does not rotate when bracket 158 is moved. Movement of bracket 158 to the phantom position shown in the drawings results in a portion of timing belt 100 being transferred from the left side of the imaginary line to the right side. This transferral of belt is accompanied by clockwise rotation of pulley 165. Thus, since pulley 164 remains stationary and pulley 165 was caused to rotate clockwise, it is seen that the movement of bracket 158 causes rotation of pulley 165 with respect to pulley 164, or, stated more directly, permits the synchronization of counting mechanism 97 with respect to the cutting edge of knife blade 18.

Movement of bracket 158 in the opposite direction would cause timing belt 100 to move from the right side of the imaginary line to the left side, and thus would cause pulley 165 to rotate in a counterclockwise direction. In the approximate dimensions shown in the drawing, synchronizing mechanism 99 is capable of changing the relationship of shaft 98 to shaft 14 approximately two-thirds of a revolution.

Although in the description above operation of synchronizing mechanism 99 was described with reference to non-rotation of shaft 14, it is to be understood that synchronizing mechanism 99 may be used to adjust the relationships of the respective shafts during operation. Since shaft 98 is the driven shaft and has relatively little inertia, it will move under the urging of movement of bracket 158 as described in the above illustration.

What has been described above are an automatic weight compensating mechanism which provides control of the thickness of slices in accordance with the average height of the item being sliced; an automatic feed control mechanism which provides for cutting a given number of slices from the beginning of the item to be sliced, which given number is less than the number of slices desired in subsequent groups of slices; and, lastly, a synchronizing mechanism suitable for synchronizing the relationship of two shafts. Although each of these is essentially independent of the operation of the other two, the three mechanisms have a combined effect which results in a slicing operation which is superior to and has many advantages over that heretofore possible. It is to be appreciated that the mechanisms described above may be varied by one skilled in the art without departing from the spirit and scope of this invention.

I claim:

1. In an automatic slicing machine provided with a rotary knife blade attached to a shaft driven at constant speed by a source of rotary power, a hydraulically operated feed ram for feeding the item to be sliced into the path of the said knife blade, feed rate control means for controlling the forward speed of said ram, stop-start control means for controlling the stopping and starting of said ram; an automatic weight compensating mechanism for sensing the height of the item to be sliced and providing an output proportional to said height; and transmission means connecting the output of said weight compensating mechanism to said feed rate control means whereby the forward speed of said ram is controlled in accordance with the height of the item to be sliced; the combination comprising an automatic feed control mechanism including a counting means providing output signals representing alternate feed and stop intervals, probe means attached to said slicing machine for sensing the arrival of the leading edge of the item to be sliced at a selected position ahead of the said knife blade and for providing an output signal representing such arrival, master control means responsive to the output signal of said probe means for stopping the ram and rendering said start-stop control means responsive to the output signals of said counting means whereby further forward movement of said ram proceeds under direct control of said counting means; and a synchronizing mechanism operably connecting the said counting mechanism to the shaft of said knife blade so that rotation of said shaft drives said counting mechanism, said synchronizing mechanism providing for rotation of said counting mechanism relative to the said shaft whereby the start-stop movement of the feed ram is synchronized with the orientation of the rotary knife blade.

2. In an automatic slicing machine provided with a rotary knife blade attached to a shaft driven at constant speed by a source of rotary power, a hydraulically operated feed ram for feeding the item to be sliced into the path of the said knife blade, feed rate control means for controlling the forward speed of said ram, and stop-start control means for controlling the stopping and starting of said ram; the combination comprising automatic feed control mechanism including a counting means providing output signals representing alternate feed and stop intervals, probe means attached to said slicing machine for sensing the arrival of the leading edge of the item to be sliced at a selected position ahead of the said knife blade and for providing an output signal representing such arrival, and master control means responsive to the output signal of said probe means for stopping the ram and rendering said start-stop control means responsive to the output signals of said counting means whereby further forward movement of said ram proceeds under direct control of said counting means.

3. In an automatic slicing machine which is provided with a rotary knife blade attached to a shaft driven at constant speed by a source of rotary power, a hydraulically operated feed ram for feeding the item to be sliced into the path of the said knife blade, a rotary operated hydraulic valve for controlling the forward speed of said ram, and stop-start control means for controlling the stopping and starting of said ram; the combination comprising an automatic weight compensating mechanism having a plurality of fingers pivotally mounted and transversely spaced in the path of the item to be sliced, said fingers being adapted to ride on the upper surface of the item to be sliced, a plurality of hydraulic cylinders respectively connected to said fingers and responsive to the pivotal orientation thereof, and a manifold responsive to the outputs of said hydraulic cylinders and providing an output which is equal to the algebraic sum of the outputs of said cylinders; and transmission means comprising a master hydraulic cylinder connected to said manifold and responsive to the output thereof, and a worm gear reducer having a body, a spur gear pivotally connected thereto, and a worm gear meshed with the teeth of said spur gear, said spur gear being connected to said rotary valve and said body being responsive to the output of said master hydraulic cylinder and adapted to being rotated by the reciprocal movement of the piston rod of said master hydraulic cylinder, whereby the forward speed of said ram is controlled in accordance with the height of the item to be sliced.

4. In an automatic slicing machine which is provided with a rotary knife blade attached to a shaft driven at constant speed by a source of rotary power, a hydraulically operated feed ram for feeding the item to be sliced into the path of the said knife blade, feed rate control means for controlling the forward speed of said ram, and stop-start control means for controlling the stopping and starting of said ram; the combination comprising an automatic feed control mechanism including a counting means providing output signals representing alternate travel and stop intervals, probe means attached to said slicing machine for sensing the arrival of the leading edge of the item to be cut at a selected position ahead of the said knife blade, switch means responsive to said probe means, and master control means including an electric circuit connected to said switch means for stopping the ram and rendering said start-stop control means responsive to the output signals of said counting means whereby further forward movement of said ram proceeds under direct control of said counting means.

5. In an automatic slicing machine which is provided with a rotary knife blade attached to a shaft driven at constant speed by a source of rotary power, a hydraulically operated feed ram for feeding the item to be sliced into the path of the said knife blade, feed rate control means for controlling the forward speed of said ram, stop-start control means for controlling the stopping and starting of said ram; and an automatic weight compensating mechanism including a plurality of spaced fingers mounted transversely in the path of the item to be sliced and adapted to sense the height of the item to be sliced, said fingers being operatively connected to said feed rate control means whereby the forward speed of said ram is controlled in accordance with the height of the item to be sliced; the combination comprising an automatic feed control mechanism including a counting means providing output signals representing alternate travel and stop intervals, probe means slidably attached to one of said fingers and adapted to be engaged by the leading edge of the item to be sliced at a selected position ahead of the said knife blade, switch means responsive to the actuation of said probe means, and master control means comprising an electric circuit including said switch means for stopping the ram and rendering said start-stop control means responsive to the output signals of said counting means whereby further forward movement of said ram proceeds under direct control of said counting means.

References Cited in the file of this patent

UNITED STATES PATENTS

| | | |
|---|---|---|
| 1,892,067 | McMillan | Dec. 27, 1932 |
| 2,212,348 | Ludington | Aug. 20, 1940 |
| 2,352,797 | Miller | July 4, 1944 |
| 2,812,792 | Allbright | Nov. 12, 1957 |
| 2,966,186 | Garapolo | Dec. 27, 1960 |
| 3,010,499 | Dahms et al. | Nov. 28, 1961 |
| 3,027,924 | Gillman | Apr. 3, 1962 |